C. A. BODDIE.
MAXIMUM DEMAND METER.
APPLICATION FILED APR. 12, 1916.
1,303,244.
Patented May 13, 1919.
2 SHEETS—SHEET 1.
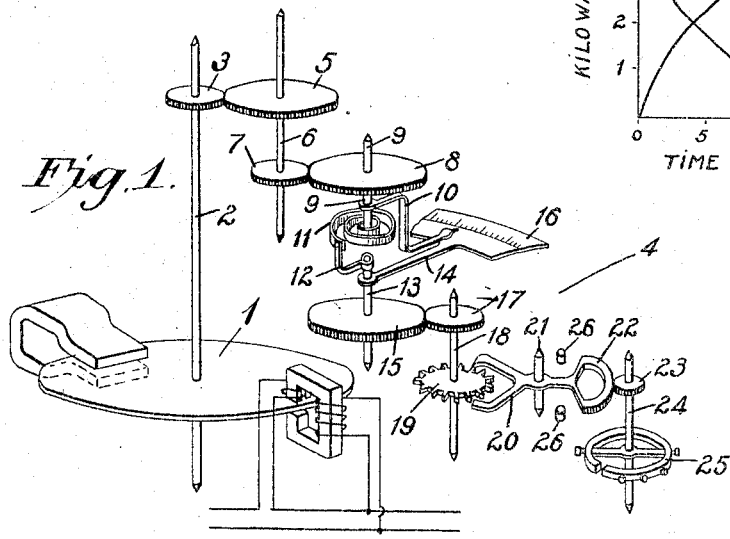
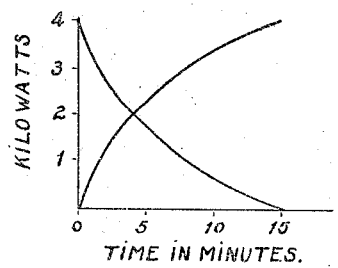
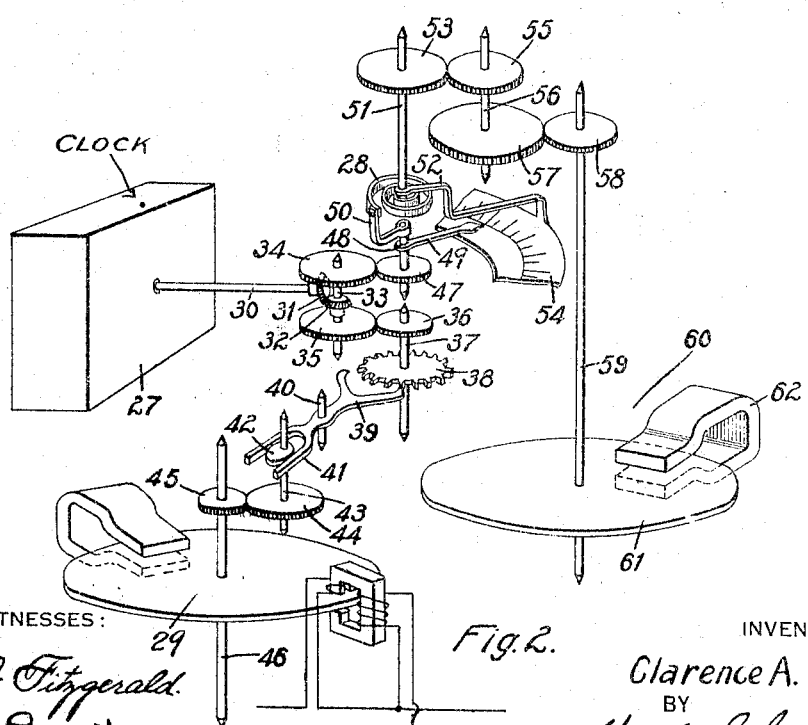
WITNESSES:
R. J. Fitzgerald
J. H. Procter
INVENTOR
Clarence A. Boddie.
BY
Wesley G. Carr
ATTORNEY

C. A. BODDIE.
MAXIMUM DEMAND METER.
APPLICATION FILED APR. 12, 1916.

1,303,244.

Patented May 13, 1919.
2 SHEETS—SHEET 2.

WITNESSES:
Fred. A. Lind.
J. H. Procter

INVENTOR
Clarence A. Boddie
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

MAXIMUM-DEMAND METER.

1,303,244.  Specification of Letters Patent.  Patented May 13, 1919.

Application filed April 12, 1916. Serial No. 90,674.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Maximum-Demand Meters, of which the following is a specification.

My invention relates to electrical measuring instruments and particularly to maximum-demand meters.

One object of my invention is to provide a meter of the above indicated character that shall be adapted to indicate the average or a substantially steady value of load that may be regarded as the demand equivalent of a fluctuating load.

Another object of my invention is to provide a relatively cheap and compact unitary device that may be easily and conveniently substituted for the integrating mechanism of a wattmeter of the ordinary type to provide a demand meter.

In the carrying out of my invention, I provide an attachment for a watthour meter comprising a movable pointer, a spring, one end of which is operatively connected to the pointer, a movable scale that is operatively connected to the other end of the spring and controlled by an escapement device that is adapted to operate in accordance with the torque of the spring or the energy traversing the watthour meter. By such an arrangement, the scale and pointer are adapted to coöperate to indicate the average or a steady value of load that may be regarded as the demand equivalent of the fluctuating load traversing the watthour meter to which the attachment is connected.

Figure 4:
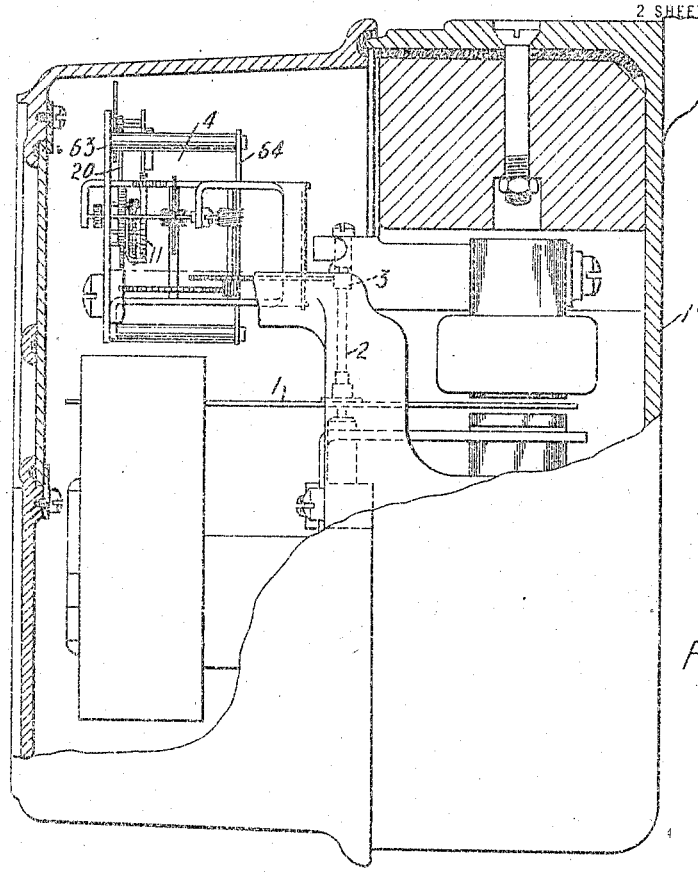
Figure 5:
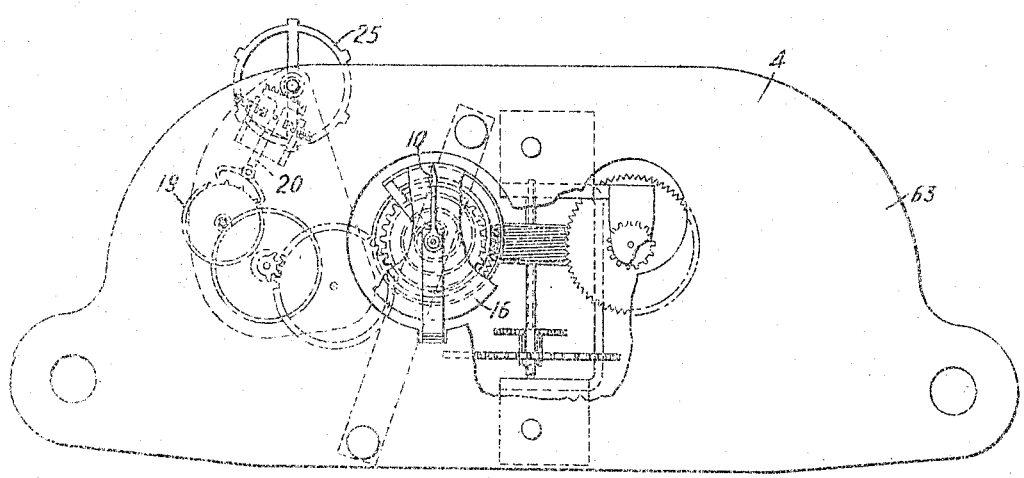

In the accompanying drawings, Figure 1 is a diagrammatic view of a maximum-demand meter attachment embodying my invention; Fig. 2 is a diagrammatic view of a modified form of demand meter embodying my invention, Fig. 3 is a diagram illustrating the characteristic time-curve of a demand meter embodying my invention, Fig. 4 is a side view, partially in elevation and partially in section, of a watthour meter embodying my invention, and Fig. 5 is a detail front elevational view, with parts broken away, of the unitary attachment embodying my invention.

In Fig. 1 of the drawings, the armature 1 of a watthour meter of the ordinary type is mounted on a shaft 2 upon which a pinion 3 is also mounted. The pinion 3 is adapted to actuate a demand or slow-responding indicating attachment 4 that indicates a relatively steady value which is the demand equivalent or the average value at any instant of the fluctuating energy traversing the windings of the meter. The attachment 4 may be detachable and is so compact in size that it may be mounted in the watthour meter in place of its integrating mechanism, substantially as shown in Fig. 4 of the drawings.

The pinion 3 engages a gear wheel 5 that is mounted on a shaft 6 upon which a pinion 7 is also mounted. The pinion 7 engages a gear wheel 8 that is mounted on a shaft 9 upon which a pointer 10 is mounted and to which the inner end of a spring 11 is attached. The outer end of the spring 11 is attached to an arm 12 that is mounted on a shaft 13 upon which an arm 14 and a gear wheel 15 are also mounted. The arm 14 is operatively connected to a scale 16 that is so disposed as to coöperate with the pointer 10. The gear wheel 15 engages a pinion 17 that is mounted on a shaft 18 upon which an escapement wheel 19 is also mounted. A double pallet 20 is pivoted on a shaft 21 and is adapted to coöperate with the escapement wheel 19. The double pallet 20 is provided with a mutilated or segmental gear wheel 22 that is adapted to engage a pinion 23 which is mounted on a shaft 24 upon which a non-restrained balance wheel 25 is also mounted. Stationary stops 26 are provided to limit the movement of the double pallet 20.

When the armature 1 is rotated, the pointer 10 will move a distance substantially proportional to the energy traversing the windings. However, when the pointer 10 is moved, the spring 11 is wound from its inner end and is permitted to unwind from its outer end in accordance with the oscillations of the double pallet 20. When the shaft 13 is permitted to turn because of the delayed release of the outer end of the spring 11, the scale 16 will be moved in the same direction that the pointer 10 was moved. Thus, the pointer 10 will coöperate with the scale 16 to indicate a value that may be assumed to represent the demand equivalent of the fluctuating energy traversing the windings of the instrument. Since the balance wheel 25 is non-restrained, the double pallet 20 will oscillate in accordance with the torque applied to the escapement wheel 19, and the scale 16 will be permitted to move substantially in accordance with the energy traversing the meter windings because the torque of the armature 1 is transmitted through the spring 11 to the escapement wheel 19.

The time required for the scale 16 to move to such a position as to indicate the value of the energy traversing the instrument may be obtained from Fig. 3 of the drawings which illustrates the characteristic curves of the instrument. That is, if four kilowatts of power traverses the winding of the instrument continuously, it will require substantially fifteen minutes for the pointer 10 to register with the four-kilowatt division on the scale 16. This is shown on the curve passing through the origin. The other curve illustrates the time required for the pointer 10 to register with the zero division on the scale after registering four kilowatts. That is, the curves illustrate the performance of the meter both on increasing and on decreasing loads.

In Figs. 4 and 5 of the drawings, the unitary attachment 4 is mounted between plates 63 and 64 that are operatively connected to a watthour meter 1ª in place of its integrating mechanism. The attachment 4 comprises a pointer 10 that is operatively connected to the inner end of a spring 11 and to the armature 1 of the meter. The outer end of the spring 11 is connected to a scale 16 and to an escapement device comprising a non-restrained balance wheel 25, an escapement wheel 19 and a double pallet 20. In all essential features, the attachments shown in Figs. 4 and 5 of the drawings are similar to that shown in Fig. 1 of the drawings.

It is a well known fact that the torque of the ordinary wattmeter is relatively small, therefore, it is frequently necessary to utilize some external power means to wind the spring, and, in view of this, I provide a clock 27, as shown in Fig. 2 of the drawings, for winding one end of a spring 28, and I cause an armature 29 of a wattmeter of the ordinary type to control the movement of a movable member 30 of the clock in accordance with the energy traversing the windings of the instrument. In the carrying out of this modification of my invention, a beveled gear wheel 31 is mounted on the movable member 30 and is adapted to engage a bevel gear 32 that is mounted on a shaft 33. Gear wheels 34 and 35 are also mounted on the shaft 33, and the gear wheel 35 is adapted to engage a pinion 36 that is mounted on a shaft 37. An escapement wheel 38 is also mounted on the shaft 37 and coöperates with a double pallet 39 that is mounted on a shaft 40. The double pallet is provided with an eccentric strap 41 that surrounds an eccentric 42 which is mounted on a shaft 43 upon which a gear wheel 44 is also mounted. The gear wheel 44 engages a pinion 45 that is mounted on the main shaft 46 upon which the armature 29 is also mounted. Thus, when the armature 29 rotates, it will permit the shaft 33 and, consequently, the gear wheel 34 to rotate in accordance with the rotation of the armature 29.

The gear wheel 34 engages a pinion 47 that is mounted on a shaft 48 upon which a pointer 49 and an arm 50 are also mounted. The outer end of the spring 28 is connected to the arm 50 and its inner end is connected to a shaft 51. An arm 52 and a gear wheel 53 are also mounted on the shaft 51, and the arm 52 is adapted to support a scale 54 that coöperates with the pointer 49. The gear wheel 53 engages a pinion 55 that is mounted on a shaft 56 upon which a gear wheel 57 is also mounted. The gear wheel 57 engages a pinion 58 that is mounted on a shaft 59 which is provided with an escapement device 60. The escapement device 60 may comprise a double pallet, an escapement wheel and a non-restrained balance wheel, substantially as shown in Fig. 1 of the drawings. However, any form of escapement may be utilized that will retard the movement of the scale an interval of time which varies in accordance with the speed of the armature 29, and, as a modification, I have shown a disk armature 61 that is mounted on the shaft 59 and is adapted to pass between the poles of a permanent magnet 62.

When the armature 29 rotates to permit the clock 27 to wind the spring 28 and to cause the pointer 49 to move a distance proportional to the energy traversing the windings of the instrument, the scale 54 will be moved but it will be retarded an interval of time that varies substantially in accordance with the speed of the armature 61. But, since the speed of the armature 61 varies in accordance with the speed of the armature 29, it will be understood that the time-lag of the movement of the scale 54 varies substantially in accordance with the speed of the armature 29 and, consequently, in accordance with the energy traversing the windings of the instrument.

Various modifications of my invention may be made without departing from the spirit and scope of the same as set forth in the appended claims.

I claim as my invention:

1. An attachment for a meter comprising a rotatable member, a spring one end of which is operatively connected to the rotatable member and an escapement device having a non-spring-restrained balance wheel connected to the other end of the spring.

2. An attachment for a meter comprising a rotatable member adapted to be actuated in accordance with the energy traversing the windings of the meter, an escapement device and a resilient member operatively disposed between the rotatable member and the escapement device.

3. An attachment for a meter comprising a movable member adapted to be actuated in accordance with the energy traversing the windings of the meter, a pointer operatively connected to the movable member, an escapement device, a resilient member one end of which is connected to the movable member and the other end of which is connected to the escapement device and a movable scale operatively connected to the escapement end of the resilient member and adapted to coöperate with the pointer.

4. The combination with a watthour meter having a movable member, of a resilient member one end of which is operatively connected to the movable member of the meter, and an escapement device operatively connected to the other end of the resilient member and adapted to operate in accordance with the torque of the resilient member.

5. The combination with a watthour meter having a movable member, of an attachment therefor comprising a resilient member one end of which is operatively connected to the movable member of the meter, and an escapement device operatively connected to the other end of the resilient member and adapted to operate in accordance with the torque of the resilient member.

6. The combination with a watthour meter, of an attachment therefor comprising a spring one end of which is operatively connected to the said meter, and an escapement device operatively connected to the other end of the spring and adapted to permit the spring to unwind from one end in accordance with the torque applied to the spring.

7. The combination with a movable member adapted to be moved in accordance with an actuating force, of a second movable member resiliently connected to the first member, and an escapement device having a freely movable balance wheel for so controlling the second movable member that the movable members coöperate to indicate a value that is the demand equivalent of a fluctuating actuating force.

8. An attachment for a meter comprising a movable member adapted to be actuated in accordance with the energy traversing the windings of the meter, an escapement device, a spring connected between the escapement device and the movable member, a pointer connected to one end of the spring, and a movable scale therefor connected to the other end of the spring.

9. In a meter, the combination with a movable member adapted to be moved in accordance with the energy traversing the meter, of a second movable member operatively connected to the first movable member, and an escapement device connected to the second movable member, said movable members being adapted to coöperate to indicate the average value of the energy traversing the meter.

10. The combination with a watthour meter, of a unitary attachment comprising means adapted to be substituted in place of the integrating mechanism of the meter for indicating the average value of the energy traversing its windings.

11. The combination with a watthour meter, of means adapted to be substituted in place of the integrating mechanism of the meter for indicating the average value of the energy traversing its windings.

12. The combination with a watthour meter, of means adapted to be substituted in place of the integrating mechanism of the meter and to be actuated by the meter to indicate a value that may be considered the demand equivalent of the fluctuating energy traversing the meter.

13. The combination with a watthour meter, of a unitary attachment adapted to be substituted for the integrating mechanism of the meter for indicating the demand equivalent of the energy traversing the windings of the meter.

14. A unitary attachment adapted to be substituted in place of the integrating mechanism of a watthour meter comprising two coöperating members each movable relatively to the movable member of the meter and means for operatively connecting the same to the movable member of the meter to be actuated thereby.

15. A unitary attachment adapted to be substituted in place of the integrating mechanism of a watthour meter comprising a movable scale actuated by the meter, a movable pointer therefor operatively connected thereto and an escapement device for the said scale.

16. A unitary attachment adapted to be substituted in place of the integrating mechanism of a watthour meter comprising a movable scale actuated by the meter, a movable pointer therefor, resilient means connected between the pointer and the scale and an escapement device for controlling the movement of one end of the resilient means.

17. An attachment for a meter comprising an actuating member, an actuated member, a spring connected therebetween and an escapement device having a non-restrained balance wheel for the actuated member.

18. An attachment for a meter comprising two coöperating members, a spring connected therebetween and an escapement device having a non-restrained balance wheel operatively connected to one of the coöperating members.

In testimony whereof I have hereunto subscribed my name this 31st day of March, 1916.

CLARENCE A. BODDIE.